United States Patent
Dadourian

(10) Patent No.: US 8,189,110 B2
(45) Date of Patent: May 29, 2012

(54) EQUALIZATION OF NOISE CHARACTERISTICS OF THE COMPONENTS OF A COMPOSITE IMAGE WITHOUT DEGRADING SUBJECT IMAGE QUALITY

(75) Inventor: Arpag Dadourian, Northridge, CA (US)

(73) Assignee: Ultimate Corporation, Chatsworth, CA (US)

(*) Notice: Subject to any disclaimer, the term of this patent is extended or adjusted under 35 U.S.C. 154(b) by 1097 days.

(21) Appl. No.: 12/079,864

(22) Filed: Mar. 28, 2008

(65) Prior Publication Data
US 2008/0252788 A1 Oct. 16, 2008

Related U.S. Application Data

(60) Provisional application No. 60/923,090, filed on Apr. 11, 2007.

(51) Int. Cl.
*H04N 5/08* (2006.01)
*H04N 9/64* (2006.01)
*H04N 9/74* (2006.01)

(52) U.S. Cl. ............ 348/586; 348/533; 348/576

(58) Field of Classification Search ............ 348/533, 348/576, 586
See application file for complete search history.

(56) References Cited

U.S. PATENT DOCUMENTS

| 4,417,791 A * | 11/1983 | Erland et al. ............ 352/45 |
| 5,424,781 A | 6/1995 | Vlahos |
| 6,069,982 A | 5/2000 | Reuman |
| 6,804,408 B1 | 10/2004 | Gallagher et al. |
| 6,868,190 B1 | 3/2005 | Morton |
| 7,171,057 B1 | 1/2007 | Wilensky et al. |
| 7,245,783 B2 | 7/2007 | Fielding |
| 2001/0052907 A1 | 12/2001 | Mukai |
| 2008/0239150 A1 * | 10/2008 | Ungerman ............ 348/576 |

FOREIGN PATENT DOCUMENTS

| EP | 0812117 A | 12/1997 |
| WO | WO-82/01972 A | 6/1982 |
| WO | WO-98/11734 A | 3/1998 |

\* cited by examiner

*Primary Examiner* — Kieu Oanh T Bui
(74) *Attorney, Agent, or Firm* — Blakely, Sokoloff, Taylor & Zafman

(57) ABSTRACT

A visible mismatch in noise characteristics between a portion of a background scene inserted in composite image by a matte generated from a blue screen and a second portion of the same background inserted by a garbage matte is significantly reduced by adding extracted noise characteristics from the foreground image to the portion of the background scene inserted by the garbage matte. The selective addition of foreground noise characteristics to portions of the background scene significantly enhances the realistic look of a composite image.

10 Claims, 5 Drawing Sheets

EQUALIZATION OF NOISE CHARACTERISTICS OF THE COMPONENTS OF A COMPOSITE IMAGE WITHOUT DEGRADING SUBJECT IMAGE QUALITY

The present patent application is a non-provisional application claiming the priority of a provisional application, namely, Application No. U.S. 60/923,090, filed Apr. 11, 2007.

BACKGROUND OF THE INVENTION

In the production of motion pictures for theaters and for television, the use of the Blue Screen Image Compositing Process is often used. While image compositing devices have been programmed to use any backing color, Green or Blue are used almost exclusively. Thus, references herein to blue screen should be understood to include any colored backing for which an image compositing device has been programmed. In image compositing the need for the camera to follow the actors often causes the camera frame to overshoot the blue screen. It is common practice to use the window function of the compositing device, such as an Ultimatte 11 available from Ultimatte Corporation, to bring in a window signal (garbage matte) from the edge of the image frame over to the edge of the blue screen. A major function of the blue screen is to generate a control signal, known as a matte or a key signal, that turns on the background scene in all areas of the blue screen not occupied by a subject. The function of a window signal is to turn on the background scene in that area of the image frame not occupied by the blue screen. The window signal is noise free since it is simply a fixed signal level.

A background scene rendered in a computer is also noise free. A matte signal generated by the blue screen contains whatever noise pattern is present in the grain of the camera film, or the electronic noise present in the video camera, which is imprinted over the background scene. Since both the background scene and window (garbage matte) signal are each noise-free, that part of the background turned on by the window remains noise-free. When viewing the background scene in the composite image, one will notice that one area of the background is noisy as compared to the noise free background area controlled by the noise free window signal. Camera noise rarely attracts the attention of a viewer until it is placed next to a noise free area, which makes the noise pattern quite obvious.

One solution to this problem has been to use the cleanup signal to raise the level of the matte signal, derived from the blue screen area, into a dip that removes all camera system noise and uneven screen illumination. Unfortunately, the use of cleanup to eliminate noise also degrades the foreground subject image by removing the thinner strands of hair, reducing shadow density, and eliminating footprints and other marks on a blue floor. In a Virtual Studio, retaining these artifacts is useful and often necessary to provide an impression of reality, which may be lacking when background scenes are rendered on a computer. The opaque portions of the foreground subject, which are not impacted by the dean up matte signal, will retain the noise levels of the camera image. When this foreground subject is composited with a noise-free background scene, the resulting scene will look unnatural, since noise is present only in some parts of the entire image.

The function "Cleanup" is explained in U.S. Pat. No. 4,344,085.

BRIEF SUMMARY OF THE INVENTION

An evenly lit blue screen area, free of shadows and foreground subjects, is sampled and stored in memory. In the composited image, portions of the background scene turned on by a garbage matte (window) signal do not contain the foreground camera noise component which is present in the background areas turned on by the matte generated from the blue screen. From the stored screen sample, the foreground camera noise component is separated, and added to the background scene in the areas turned on by the garbage matte (window) signal. When a dean up matte signal is used to compensate for lighting unevenness of the blue screen, the foreground camera noise component is also eliminated from the matte that turns on the background scene. Using the same clean up matte signal, the foreground camera noise component separated from the stored screen sample is added to the noise-free portions of the background scene. The composited scene will have a uniform camera noise in all portions of the image, as if the background and foreground scene are both being viewed by the camera.

DETAILED DESCRIPTION OF THE INVENTION

Figure 1:
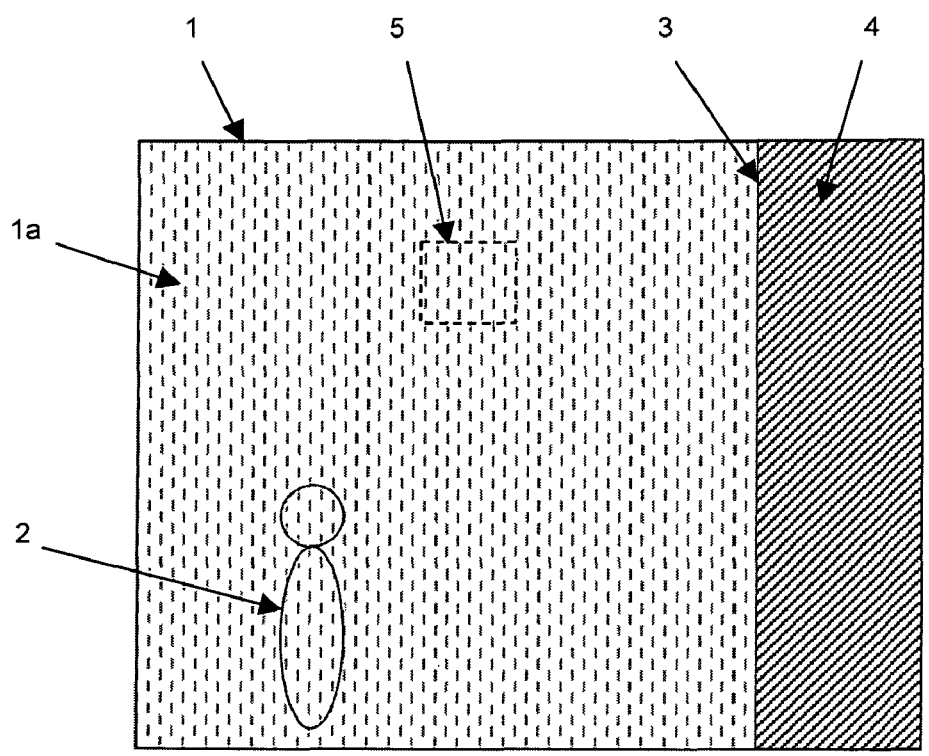
FIG. 1 shows a foreground image frame in which the blue screen does not extend to one side of the frame, with a garbage matte covering the gap between the edge of the blue screen and the side of the frame.

FIG. 1 shows an image frame 1, where a foreground subject 2 is standing in the blue screen area 3, with noise 1a generated by a foreground camera or imager (not shown). The blue screen area does not extend to one of the edges of the image frame. A garbage matte 4, digitally generated in a computer, covers the non-blue screen parts of the image frame. Electronic noise 1a, generated by the imager, is present in all portions of the foreground image, including the blue screen area 3 and the foreground subject 2. The digitally generated garbage matte 4 does not include the noise characteristics present in the imager.

Figure 2:
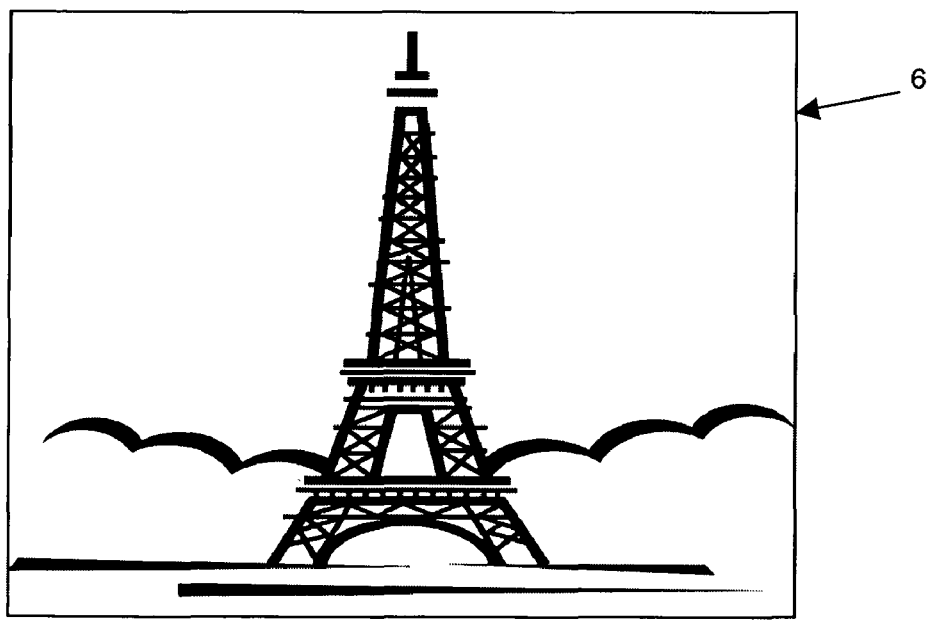
FIG. 2 shows a background image frame that will replace the blue screen portion of the foreground image in the composite image.

A matte signal, generated from the blue screen area, is used to proportionately replace this area with the background scene 6 of FIG. 2, based on the amplitude of the matte signal. Randomly varying noise levels thus become part of the matte signal amplitude variations.

Figure 3:
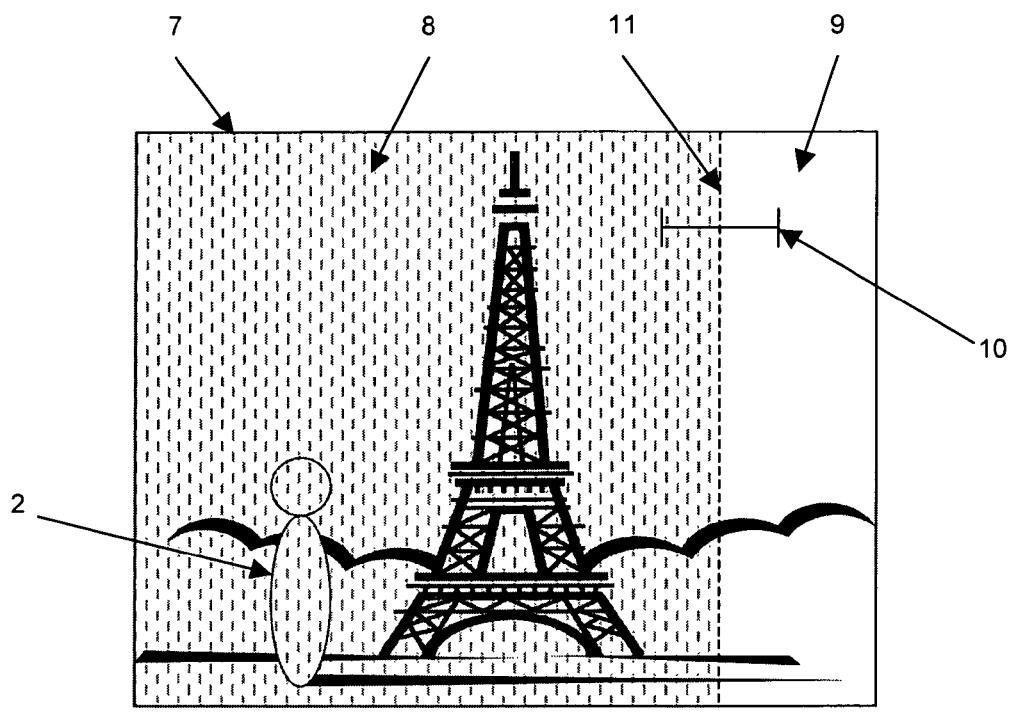
FIG. 3 shows the composite image frame where one portion of the background image is added using the matte signal generated from the blue screen which includes the noise characteristics of the foreground camera, and a second portion of the background image is added using the garbage matte which does not include the foreground camera noise characteristics.

The composited frame 7 in FIG. 3 shows the foreground subject 2 against the background frame 6 of FIG. 2. The foreground subject 2 and the portion 8 of the background scene turned on by the blue screen matte signal have retained the camera noise characteristics. The portion of the background scene turned on by the garbage matte 9 does not include any of the noise characteristics of the imager which is why the portion of the background scene which extends into the garbage matter area appears without any noise.

Figure 4:
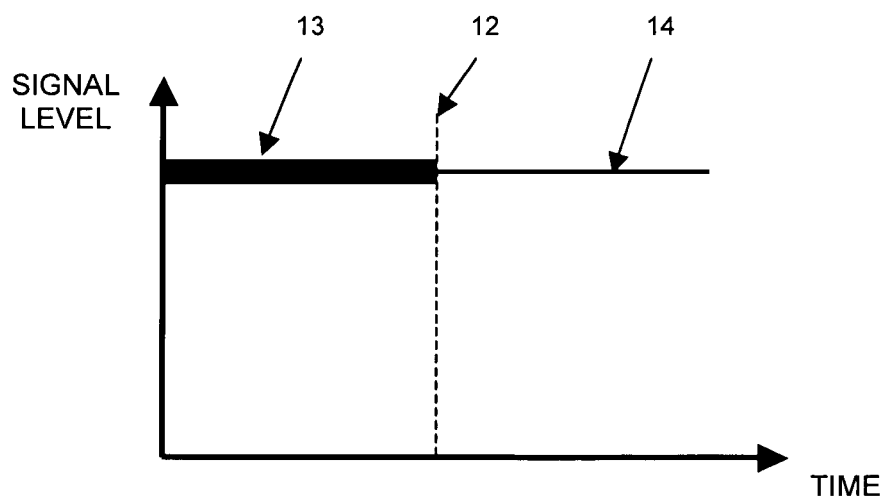
FIG. 4 represents the background image signal levels, where one portion of it is added using the matte signal generated from the blue screen, and a second portion of the background is added using the garbage matte.

FIG. 4 shows the amplitude of a segment 10 of the composite image of FIG. 3. The signal level 13 corresponds to the portion of the background scene turned on by the blue screen matte. The signal level 14 corresponds to the portion of the background scene turned on by the garbage matte. The partition line 12 is a visual representation of the edge of the garbage matte 11 in FIG. 3. The thickness of the signal level 13 represents the imager noise characteristics that have been transferred to the background scene by the matte signal. This is the amount of noise the background scene would have had if it was actually viewed by the foreground camera. The signal level 14 of the portion of the background scene that is turned on by the garbage matte has no noise characteristics associated with it. This amount of signal level mismatch is quite noticeable, particularly when the garbage matte has an abrupt and sharp transition. Even when using garbage mattes with more gradual transitions, the mismatch remains visible.

In order to better match the levels of the two portions of the background scene, some level of clean up function could be applied. The clean up function gradually pushes the matte into a ceiling or a clip, thus gradually eliminating amplitude variations due to noise. However, in addition to eliminating noise, fine semi-transparent details of the foreground object are also eliminated when the clean up function is applied. Even if the penalty of losing fine foreground detail is minimum, the resulting composite image will not look natural, as the lack of noise in the background scene will not match the noise levels of the foreground subject.

Figure 5:
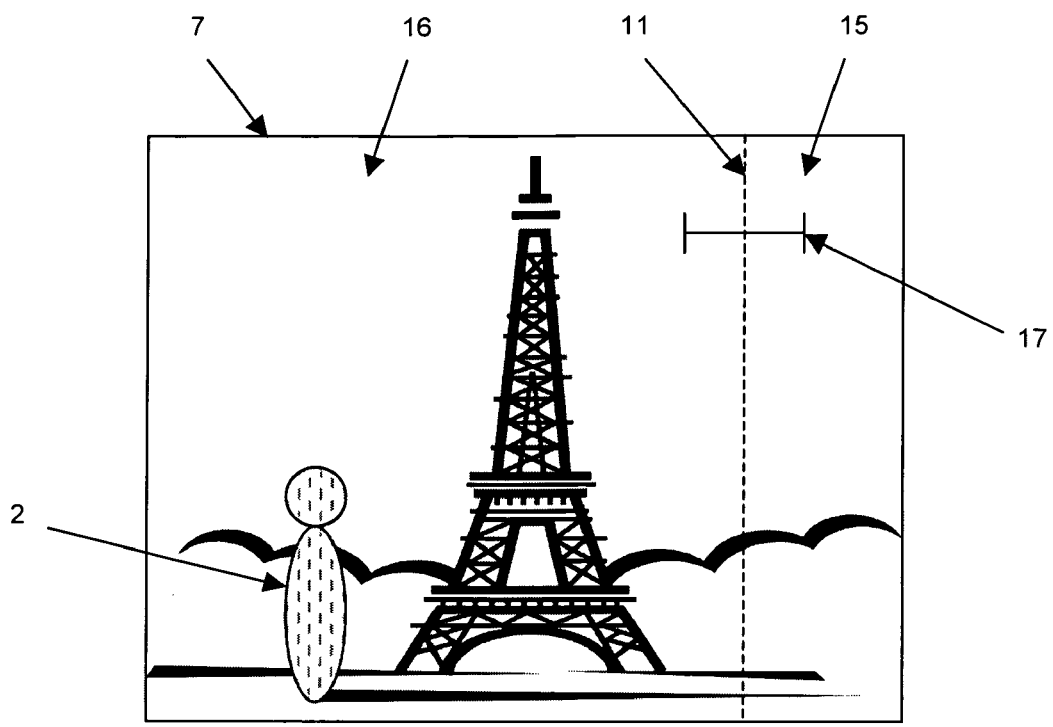
FIG. 5 shows the composite image frame where one portion of the background image is added using the matte signal generated from the blue screen where a clean up function is applied, which eliminates the noise characteristics of the foreground camera, and a second portion of the background image is added using the garbage matte which does not include the foreground camera noise characteristics.

The image frame 7 in FIG. 5 shows the same composite image as in FIG. 3, but with clean up function applied to it to eliminate the noise component from the background scene. The portion of the background scene turned on by the cleaned up matte signal 16 looks the same as the portion of the background turned on by the garbage matte 15. Both portions of the background scene lack the noise characteristics of the foreground subject 2.

Figure 6:
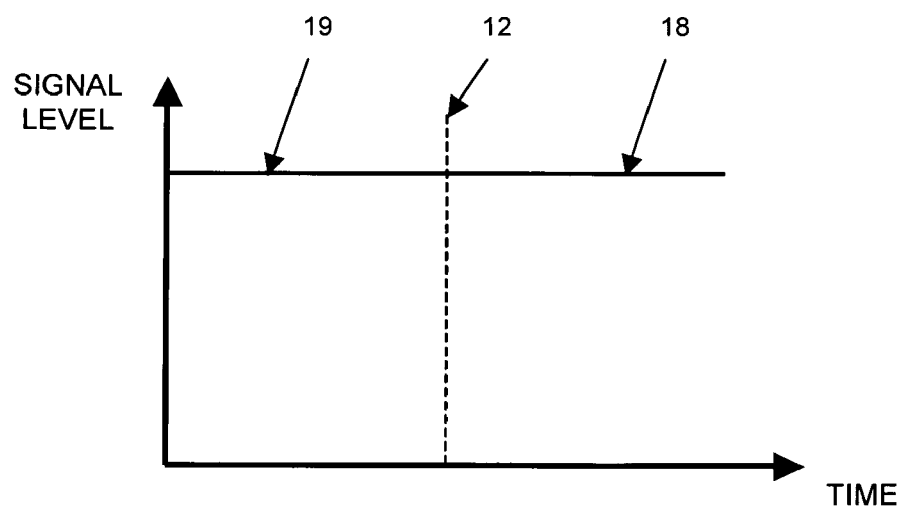
FIG. 6 represents the background image signal levels, where one portion of it is added using the matte signal generated from the blue screen which includes a clean up function, and a second portion of the background is added using the garbage matte.

FIG. 6 shows the amplitude of a segment 17 of the composite image of FIG. 5. The signal level 19 corresponds to the portion of the background scene turned on by the clean up matte. The signal level 18 corresponds to the portion of the background scene turned on by the garbage matte. The partition line 12 is a visual representation of the edge of the garbage matte 11 in FIG. 5. The signal levels of the two portions of the background scene are similar.

Rather than eliminating the camera noise from the matte by the use of the clean up function, adding the camera noise to the portion of the background scene that is turned on by the garbage matte will produce a more convincing composite image. The characteristics of the camera noise can be extracted by sampling an area 5 of the blue screen, as shown in FIG. 1. These noise samples can be added, in a pseudo-random manner, to the background scene portions turned on by the garbage matte.

Figure 7:
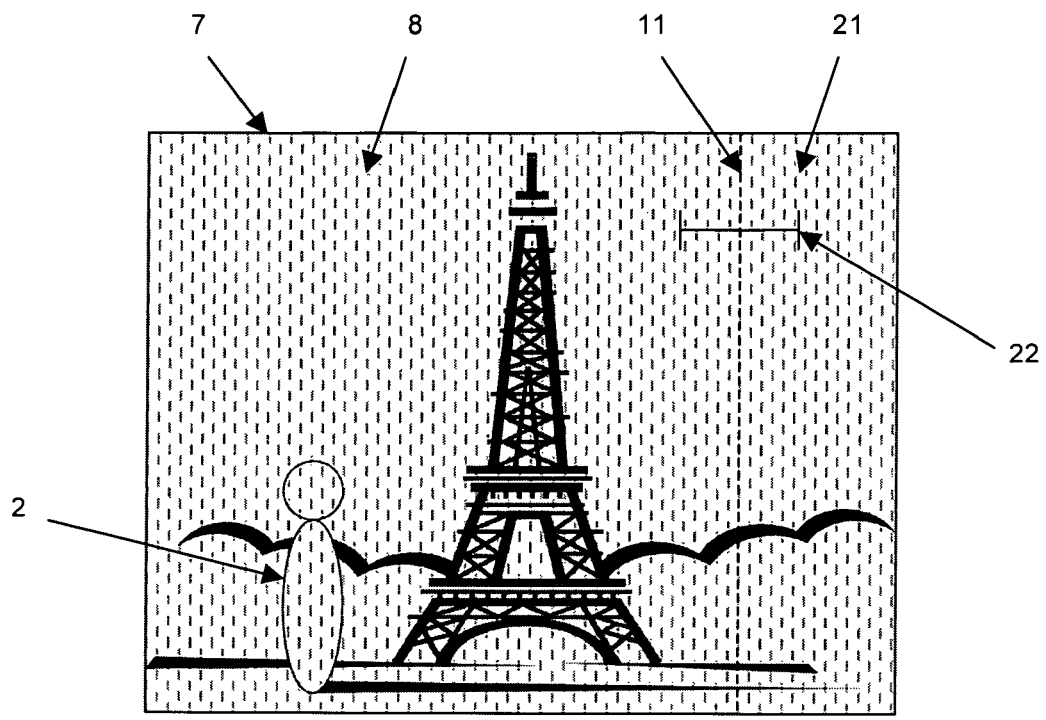
FIG. 7 shows the composite image frame where one portion of the background image is added using the matte signal generated from the blue screen which includes the noise characteristics of the foreground camera, and a second portion of the background image is added using the garbage matte which includes the sampled foreground camera noise characteristics.

FIG. 7 shows a composite image of the foreground subject 2 against the background scene 7, where the portion 8 of the background turned on by the matte signal 8 has maintained the noise characteristics of the foreground camera, and the portion of the background turned on by the garbage matte has the extracted camera noise 21 added to it. The resulting composite image has uniform noise characteristics, both in the foreground and in all the background regions.

Figure 8:
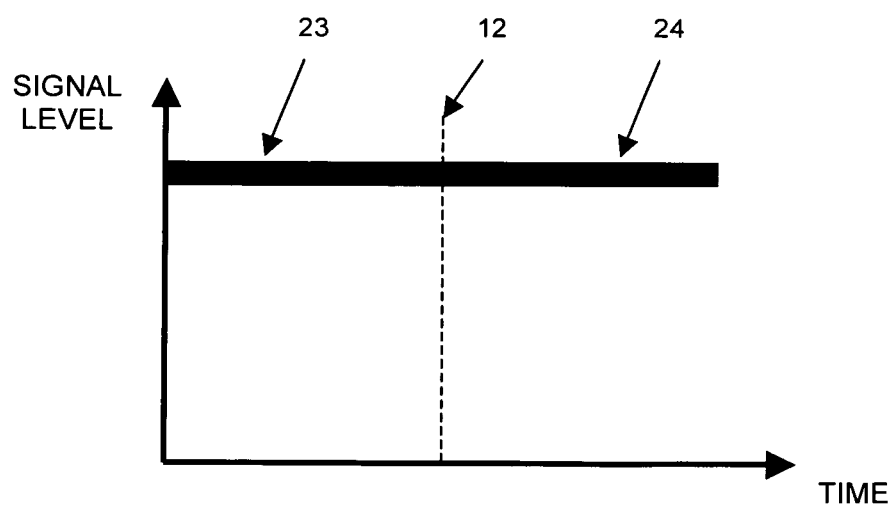
FIG. 8 represents the background image signal levels, where one portion of it is added using the matte signal generated from the blue screen, and a second portion of the background is added using the garbage matte which includes the sampled foreground camera noise characteristics.

FIG. 8 shows the amplitude of a segment 22 of the composite image of FIG. 7. The signal level 23 corresponds to the portion of the background scene turned on by the blue screen matte. The signal level 24 corresponds to the portion of the background scene turned on by the garbage matte. The partition line 12 is a visual representation of the edge of the garbage matte 11 in FIG. 7. The thickness of the signal level 23 represents the imager noise characteristics that have been transferred to the background scene by the matte signal. This is the amount of noise the background scene would have had if it was actually viewed by the foreground camera. The signal level 24 of the portion of the background scene that is turned on by the garbage matte has the extracted noise characteristics associated with the foreground camera added to it. The signal level and noise characteristics of both portions of the background scene are similar.

There are some situations, like uneven lighting on the blue screen, where the use of some amount of clean up is unavoidable. In this situation, rather than eliminating the camera noise characteristics from the matte, and subsequently from the background scene as shown in FIG. 5, the clean up matte can be used in a similar manner as the garbage matte to add the extracted camera noise back to the background scene, thus minimizing the impact of the clean up on the composite image. The resulting composite image will have the camera noise characteristics over the entire image, similar to image frame shown in FIG. 7.

IMPLEMENTATION

Figure 9:
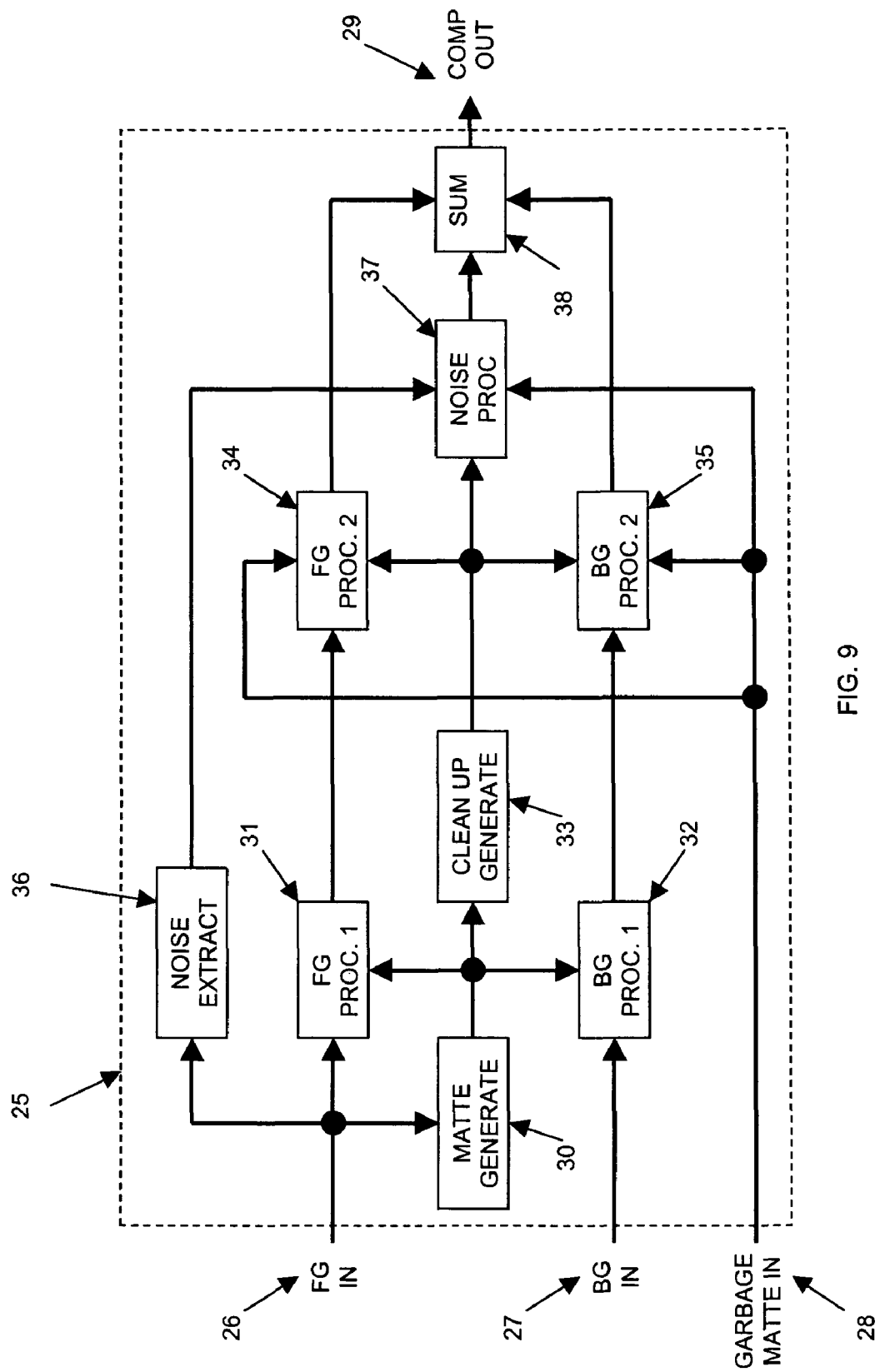
FIG. 9 shows a block diagram of a compositing system that incorporates the invention.

FIG. 9 shows the block diagram of a basic compositing system 25 which has a foreground source input 26, a background source input 27, a garbage matte source input 28, and a composite output 29. In a typical Virtual Studio environment, the foreground source will be a camera looking at a foreground subject against a blue (or green) screen. The background source will be a computer graphics system that generates the background scene, together with an alpha (key) signal that will become the garbage matte source.

The Matte Generate block 30 generates a matte signal from the blue screen which has a value of zero in fully opaque foreground subject areas, and non-zero values in the screen areas. This matte signal is used to remove the screen portion of the foreground image in FG Proc. 1 block 31, and to remove the background scene in the portions occupied by the foreground subject in BG Proc. 1 block 32. The matte signal is also used to generate a clean up matte in the Clean Up Generate block 33 to further process the foreground and the background images, when a clean up function is needed, in FG Proc. 2 block 34 and BG proc. 2 block 35, respectively.

The garbage matte is also used to process the foreground image in FG Proc. 2 block 24, and the background image in BG Proc. 2 block 25, in the areas where the blue screen matte does not extend to the edges of the foreground image frame.

The foreground camera noise characteristics are extracted from the foreground source in the Noise extract block 36. The extracted noise signal is processed in Noise Proc. block 37 to define portions of the background scene to which the noise will be added based on the garbage matte and the dean up matte.

The processed foreground from FG Proc. 2 block 34, the processed background from BG Proc. 2 block 35, and the processed noise from Noise Proc. block 37 are added together in the Sum block 38, and the composite image is outputted from the system at Comp Out 29.

All the functions described above, such as matte generation, foreground and background processing, have been used for many years in image compositing. Noise extraction processes, like high-pass filtering, are commonly used in image processing.

The invention claimed is:

1. A method for maintaining a uniform noise pattern over a background scene portion of a composite image of the background scene and a foreground scene without degrading the image quality of the foreground scene comprising:
    a) obtaining a sample noise pattern signal for a colored backing used to create the foreground scene, said foreground scene including said backing and an overshoot portion which extends past the boundary of the backing;
    b) generating a garbage matte signal corresponding to said overshoot portion;
    c) adding said sample noise pattern signal to said garbage matte signal to produce a modified garbage matte signal;
    d) creating the composite image using said modified garbage matte signal and signals representing said foreground scene and said background scene.

2. The method of claim 1 in which said colored screen is a color for which a compositing device used in said process is programmed.

3. The method of claim 1 in which said noise pattern is generated by an imager.

4. The method of claim 1 in which said garbage matte signal is noise free.

5. A method for maintaining a uniform noise pattern over a background scene portion of a composite image of the background scene and a foreground scene without degrading the image quality of the foreground scene comprising:
    a) obtaining a sample noise pattern signal for a colored backing used to create the foreground scene, said foreground scene including said backing and an overshoot portion which extends past the boundary of the backing;
    b) generating a garbage matte signal corresponding to said overshoot portion;
    c) generating a background turn-on signal corresponding to the portion of the foreground scene occupied by said backing,
    d) applying a clean up function for eliminating lighting unevenness of said backing to said background turn-on signal to produce a modified background turn-on signal,
    e) adding said sample noise pattern signal to said garbage matte signal to produce a modified garbage matte signal;
    f) creating the composite image using said modified garbage matte signal and said modified background turn-on signal and signals representing said foreground scene and said background scene.

6. The method of claim 5 in which said colored screen is a color for which a compositing device used in said process is programmed.

7. The method of claim 5 in which said noise pattern is generated by an imager.

8. The method of claim 5 in which said garbage matte signal is noise free.

9. An apparatus for maintaining a uniform noise pattern over a background scene portion of a composite image of the background scene and a foreground scene without degrading the image quality of the foreground scene comprising:
    a) a first foreground processor which inputs a foreground source signal including a foreground subject area and a colored screen area,
    b) a matte generator block coupled to the first foreground processor and operates to generate a matte signal which has a value of zero in fully opaque portions of the foreground subject area, and non-zero values in the colored screen area, wherein the first foreground processor uses the matte signal to remove the colored screen portion of the foreground source signal and output a first processed foreground signal,
    c) a first background processor which inputs a background source signal including a background scene, said first background processor coupled to the matte generator and which uses the matte signal to remove the background scene in the portions of the background source signal corresponding to the foreground subject and output a first processed background signal,
    d) a clean up generator block coupled to the matte generator block which uses the matte signal to generate a clean up matte signal,
    e) a second foreground processor coupled to the first foreground processor and the clean up generator block to:
        1) selectively further process the first processed foreground signal in the areas where the colored screen area does not have even and uniform lighting, and
        2) input a garbage matte signal to selectively further process the first processed foreground signal in the areas where the colored screen area does not extend to the edges of the foreground scene, to output a second processed foreground signal,
    f) a second background processor which is coupled to the first background processor and the clean up generator block to:
        1) use the clean up matte signal to selectively further process the first processed background signal in the areas where the colored screen area does not have even and uniform lighting, and
        2) input the garbage matte signal and use the garbage matte signal to selectively further process the first processed background signal in the areas where the colored screen area does not extend to the edges of the foreground scene, to output a second processed background signal,
    g) a noise extract block coupled to the foreground signal input and the matte generator block to generate an extracted noise signal by extracting noise characteristics from the foreground signal,
    h) a noise processor which inputs the garbage matte signal and the clean up matte signal and is coupled to the noise extract block which uses the extracted noise signal to define portions of the background scene to which the noise will be added based on the garbage matte and the clean up matte and output a processed noise signal,
    i) a sum block coupled to the second foreground processor, the second background processor and the noise processor to add the second processed foreground signal, the second processed background signal, and the processed noise signal, to produce a composite image signal output.

10. An apparatus for maintaining a uniform noise pattern over a background scene portion of a composite image of the background scene and a foreground scene without degrading the image quality of the foreground scene comprising:
   a) a first foreground processor which inputs a foreground source signal including a foreground subject area and a colored screen area and uses a matte signal to remove the colored screen portion of the foreground source signal and output a first processed foreground signal,
   b) a first background processor which inputs a background source signal including a background scene and which uses the matte signal to remove the background scene in the portions of the background source signal corresponding to the foreground subject and output a first processed background signal,
   c) a clean up generator block coupled to the first foreground processor and the first background processor and which uses the matte signal to generate a dean up matte signal,
   d) a second foreground processor coupled to the first foreground processor and the clean up generator block to input a garbage matte signal to selectively further process the first processed foreground signal in the areas where the colored screen area does not extend to the edges of the foreground scene, to output a second processed foreground signal,
   e) a second background processor which is coupled to the first background processor and the clean up generator block to input the garbage matte signal and use the garbage matte signal to selectively further process the first processed background signal in the areas where the colored screen area does not extend to the edges of the foreground scene, to output a second processed background signal,
   f) a noise extract block coupled to the foreground signal input to generate an extracted noise signal by extracting noise characteristics from the foreground signal,
   g) a noise processor which inputs the garbage matte signal and the clean up matte signal and is coupled to the noise extract block which uses the extracted noise signal to define portions of the background scene to which the noise will be added based on the garbage matte and the clean up matte and output a processed noise signal,
   h) a sum block coupled to the second foreground processor, the second background processor and the noise processor to add the second processed foreground signal, the second processed background signal, and the processed noise signal, to produce a composite image signal output.

* * * * *